No. 839,051. PATENTED DEC. 18, 1906.
W. TURNEY.
REAMER.
APPLICATION FILED OCT. 18, 1905.
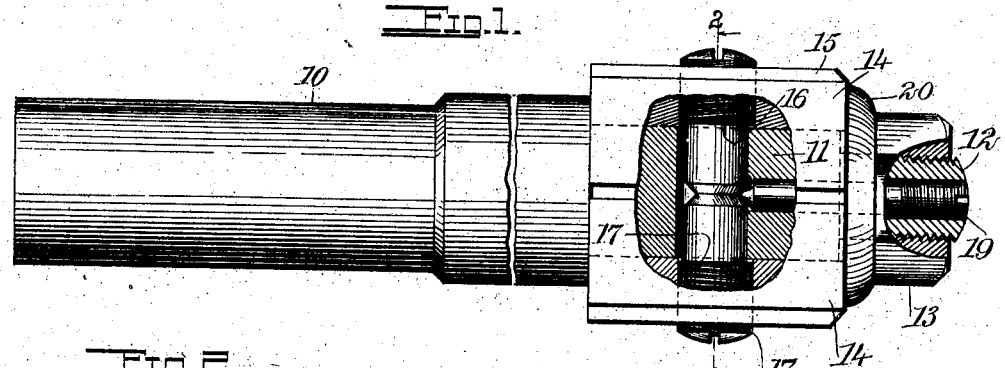
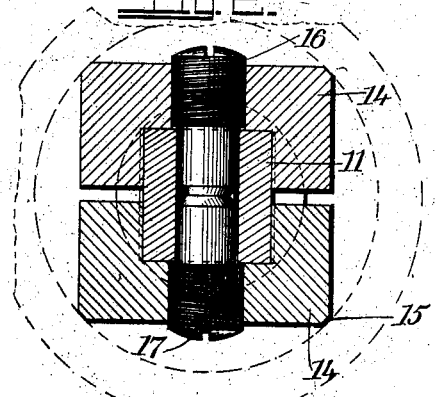
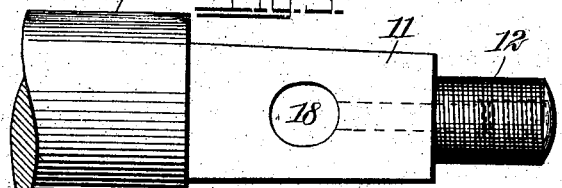
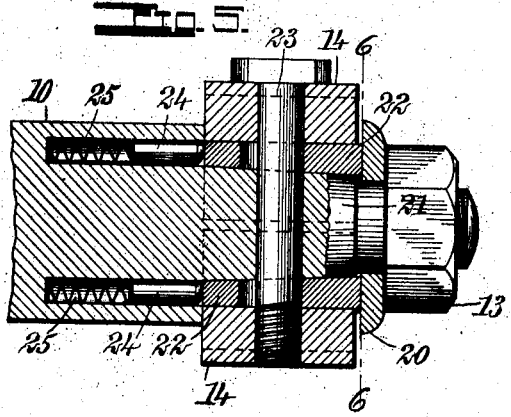
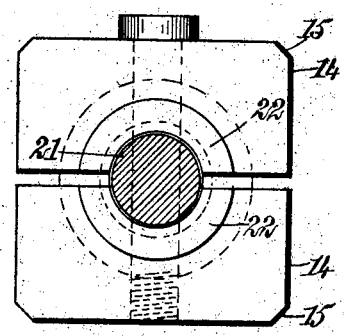
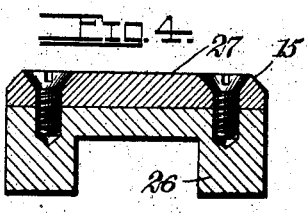
WITNESSES:
L. Almquist
C. R. Ferguson
INVENTOR
William Turney
BY
ATTORNEYS
THE NORRIS PETERS CO., WASHINGTON, D. C.

UNITED STATES PATENT OFFICE.

WILLIAM TURNEY, OF HYDE PARK, MASSACHUSETTS, ASSIGNOR OF ONE-HALF TO DAVID H. REGAN, OF HYDE PARK, MASSACHUSETTS.

REAMER.

No. 839,051.     Specification of Letters Patent.     Patented Dec. 18, 1906.

Application filed October 18, 1905. Serial No. 283,260.

*To all whom it may concern:*

Be it known that I, WILLIAM TURNEY, a citizen of the United States, and a resident of Hyde Park, in the county of Norfolk and State of Massachusetts, have invented a new and Improved Reamer, of which the following is a full, clear, and exact description.

This invention relates to improvements in tools for reaming metal, the object being to provide an expanding-reamer having a plurality of cutting-corners and so constructed that there will be no vibration, thus resulting in an even and smoothly-finished cut.

I will describe a reamer embodying my invention and then point out the novel features in the appended claim.

Reference is to be had to the accompanying drawings, forming a part of this specification, in which similar characters of reference indicate corresponding parts in all the figures.

Figure 1 is a side-view, partly in section, of a reamer embodying my invention. Fig. 2 is a section on the line 2 2 of Fig. 1. Fig. 3 is a plan showing the tapered shank of the tool. Fig. 4 is a detail illustrating the modification in the cutter. Fig. 5 is a longitudinal section showing another modification, and Fig. 6 is a section on the line 6 6 of Fig. 5.

Referring first to the example of my improvements shown in Figs. 1, 2, and 3, 10 designates the body or stem of the tool having a shank 11, which is tapered on opposite sides, as clearly indicated in Fig. 5, and this shank 11 terminates in a threaded extension 12, engaged by a tightening-nut 13. Arranged on the shank 11 and movable outward and inward with relation thereto are the cutting-blocks 14, having cutting-corners 15, these corners being beveled, as clearly illustrated, whereby to exert a scraping effect on the work, and they are adjusted with relation to the shank by means of a screw having right and left hand threads 16 17, the threaded portions engaging in tapped holes in the blocks, and the screw is passed through a slot 18 in the shank, and the expanding-screw has a central annnular channel which receives the end of a screw 19, operating in engagement with an interior thread in the projection 12. The screw 19 is designed to hold the expanding-screw from lengthwise movement. When the cutting-blocks are adjusted crosswise by means of the expanding-screw, the nut 13 is turned to force a washer 20 tightly against the outer ends of the blocks. In the example of my improvement above described the shank 11 is square in cross-section. In Figs. 5 and 6, however, I show a longitudinally-tapering and round shank 21, movable on which are interiorly-tapered segmental bushings 22, which are designed by movement lengthwise of the shank to cause the adjustment of the cutting-blocks. These segmental bushings are provided with slots through which a bolt 23 passes, the said bolt also passing through holes in the cutting-blocks and through a hole in the shank, the threaded portion of said bolt engaging with the interior thread of an opening in one of the blocks, as shown in Fig. 5. The segmental adjusting-bushings are forced inward by means of a nut 13, similar to that first described, between which and the bushings is a washer 20. Upon loosening the nut 13 the bushings are forced outward by means of plungers 24, arranged in openings in the body portion 10, and forced outward by means of springs 25. When the bushings are forced outward, it is obvious that the cutting-blocks may be drawn toward the shank by means of the bolt 23. The cutting-blocks, as described, will be made of tool-steel. In Fig. 4, however, I have shown a block having a body portion 26, which may be made of any suitable metal, and secured to the same are steel plates 27, having cutting edges similar to those first described.

It will be understood that while the cutting-blocks are described as "cutting-blocks" their action is, more properly speaking, that of scraping rather than cutting.

Having thus described my invention, I claim as new and desire to secure by Letters Patent—

A reamer comprising a body portion, and a reduced shank having a screw-threaded end, said body portion being provided with a shoulder adjacent to the shank and said shank being provided with an elongated transverse opening and a longitudinal screw-threaded opening communicating therewith, segmental cutting-blocks having openings oppositely threaded and registering with the transverse opening of the shank, a screw traversing the transverse opening of the shank and having its ends threaded into the openings of the cutting-blocks, said screw being provided with a central annular groove, a screw threaded into the longitudinal opening of the shank and engaging the annular groove, a washer on the end of the shank and a nut engaging the washer for forcing the cutting-blocks against the shoulder.

In testimony whereof I have signed my name to this specification in the presence of two subscribing witnesses.

WILLIAM TURNEY.

Witnesses:
GUSTAF M. ANDERSSON,
EDWIN D. PHELPS.